United States Patent [19]

Banjo et al.

[11] Patent Number: 4,926,034

[45] Date of Patent: May 15, 1990

[54] CONNECTOR IN EXTERNAL DEVICE FOR CONNECTION TO IC CARD

[75] Inventors: Toshinobu Banjo; Tetsuya Ueda; Shigeo Onoda, all of Itami, Japan

[73] Assignee: Mitsubishi Denki Kabushiki Kaisha, Japan

[21] Appl. No.: 173,167

[22] Filed: Mar. 25, 1988

[30] Foreign Application Priority Data

Mar. 27, 1987 [JP] Japan .................................. 62-75127

[51] Int. Cl.[5] .............................................. G06K 19/06

[52] U.S. Cl. .................................... 235/492; 235/441; 439/137

[58] Field of Search ................ 235/380, 492; 439/136, 439/137, 140

[56] References Cited

U.S. PATENT DOCUMENTS 4,780,604 10/1988 Hasegawa et al. .................. 235/492

FOREIGN PATENT DOCUMENTS 59-127284 7/1984 Japan .

*Primary Examiner*—David L. Trafton

*Attorney, Agent, or Firm*—Leydig, Voit & Mayer

[57] ABSTRACT

A connector provided in an external device for an IC card having a card shutter provided with slide members, the shutter being capable of advancing and retreating and adapted to cover and protect external terminals of the IC card when the card is not used. This connector is provided with electroconductive pins adapted to move the shutter in the direction opposite to that of the insertion of the IC card so as to open the shutter of the IC card by contacting the slide member of the card shutter when the IC card is inserted into the connector, and an earth line for grounding the pin.

3 Claims, 5 Drawing Sheets

CONNECTOR IN EXTERNAL DEVICE FOR CONNECTION TO IC CARD

BACKGROUND OF THE INVENTION

This invention relates to a connector which is provided in an external device, such as a card reader for a game-program IC card, and which is adapted for connection to the IC card.

A conventional connector provided in an external device for an IC card is constructed as shown in FIGS. 1A, 1B, and 1C. An 1C card which is inserted into this connector has a structure such as that shown in FIGS. 2A, 2B, and 2C. As shown in these figures, a card reader connector 1 which is a connector disposed in an external device (not shown) for the card has a card-insertion opening 2 and a card-receiving portion 3. An IC card 4 is formed such that it can be inserted into and pulled out of the card-receiving portion of the card reader connector. The IC card 4 has a package 5 in which a semiconductor device 4*a* is encapsulated, metal panels 5*a* disposed on upper and lower surfaces of this package, and a plurality of external terminals 6 arranged on one end of the package 5. The package 5 is formed of an insulating material, and an insulating material coats all surfaces of the metal panels 5*a*. A card shutter 7 is provided on the package 5 of the IC card 4 so as to be slidable in an insertion direction of the IC card and adapted to protect the external terminals 6 when the card is not used. The card reader connector 1 is provided with shutter-opening-closing pins 8 adapted to open the shutter 7 by moving it in the direction opposite to that of the insertion of the card, and a plurality of electrodes 9 capable of being elastically deformed to contact with the external terminals 6 respectively when the card is inserted into the connector. The shutter-opening-closing pins 8 can be made of metal or an insulating material. The shutter 7 is provided with slide members 10 having pin-contact portions 10*a* (see FIG. 2B) which contact the pins 8 when the IC card 4 is inserted into the card reader connector 1.

When the IC card 4 is used with the thus-constructed card reader connector 1, the IC card 4 is inserted through the card-insertion opening 2 into the card-receiving portion 3 of the card reader connector 1. At the same time, as shown in FIGS. 3A, 3B, and 3C, the pin-contact portions 10*a* of the slide member 10 are brought into contact with the pins 8 so as to open the shutter 7 and to connect the external terminals 6 of the IC card 4 and the electrodes 9 of the card reader connector 1 to each other.

The connection of the electrodes 9 of the card reader connector 1 and the external terminals 6 of the IC card 4 is released by pulling the IC card 4 out of the card-receiving portion 3.

In this type of connector for connecting an external device to the IC card, friction between the card reader connector 1 and the IC card 4 and/or between the shutter 7 and the package 5 of the IC card 4 tends to generate static electricity when the IC card 4 is inserted into or pulled out from the card reader connector 1. If this static electricity flows through the external terminals 6, there is a possibility of the semiconductor device 4*a* in the IC card 4 being damaged or a possibility of software errors occurring due to noise, resulting in reduction of the reliability of the IC card operation.

SUMMARY OF THE INVENTION

The present invention has been achieved in consideration of these problems, and an object of the present invention is to provide a connector in an external device for an IC card, which is capable of preventing the breakdown of a semiconductor device or occurrence of software errors, thereby improving IC card operation reliability.

To this end, the present invention provides a connector in an external device for an IC card in which pins for opening the shutter are formed from an electroconductive material and are grounded to ground any static electricity generated.

In accordance with the present invention, when the IC card is inserted into the connector of the external device, static electricity which is caused by friction between the connector and the IC card and/or between the shutter and the package of the IC card can be inhibited from flowing through the external terminal of the IC card and/or the electrodes of the card reader connector.

DESCRIPTION OF THE PREFERRED EMBODIMENT

Figure 1A:
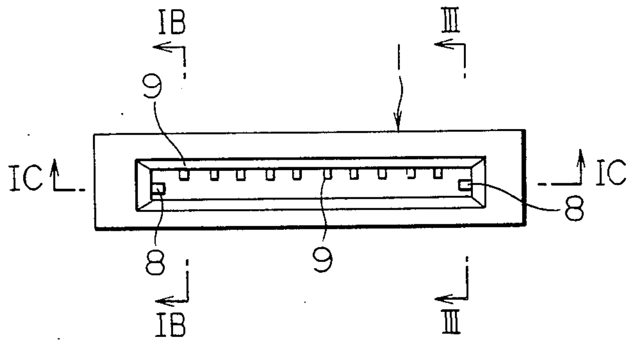
FIG. 1A PRIOR ART
FIG. 1 is a front view of a conventional connector provided in an external device for an IC card.
FIG. 1B is a cross-sectional view taken along the line IB–IB of FIG. 1A.
FIG. 1C is a cross-sectional view taken along the line IC–IC of FIG. 1A.
Figure 1B:
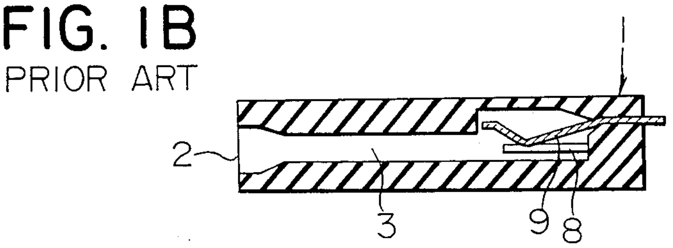
FIG. 1B PRIOR ART
Figure 1C:
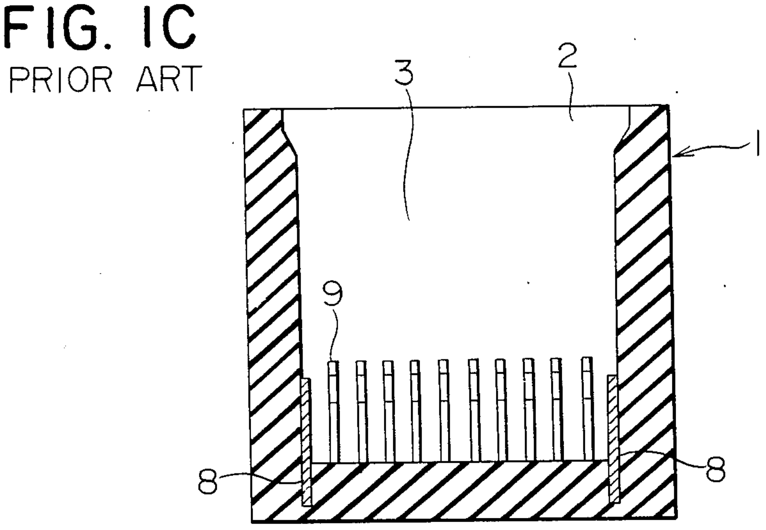
FIG. 1C PRIOR ART
Figure 2A:
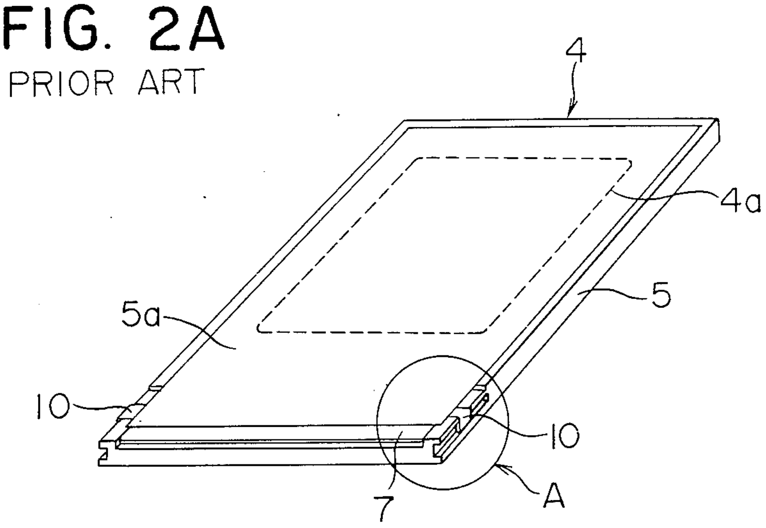
FIG. 2A PRIOR ART
FIG. 2A is a perspective view of the IC card.
Figure 2B:
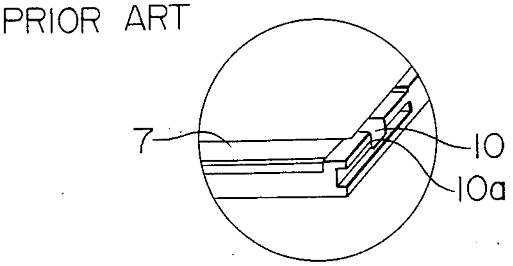
FIG. 2B PRIOR ART
FIG. 2B is an enlarged perspective view of a portion A of the IC card shown in FIG. 2A.
Figure 2C:
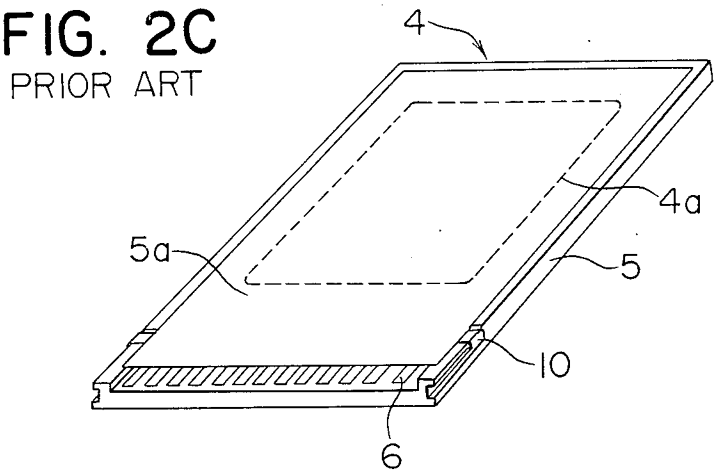
FIG. 2C PRIOR ART
FIG. 2C is a perspective view of the IC card with the cover open as when being used.
Figure 3A:
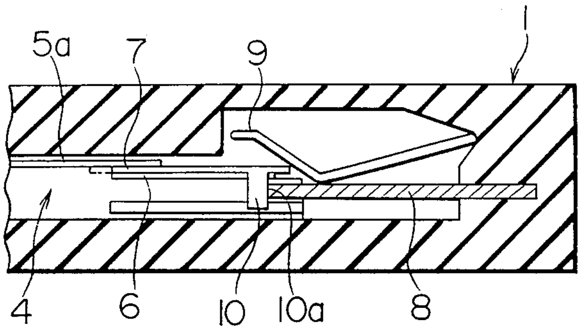
FIG. 3A PRIOR ART
FIGS. 3A, 3B, and 3C are partial cross-sectional views of the conventional connector of the external device for the IC card taken along lines III—III of FIG. 1A, illustrating the insertion of the IC card into the connector.
Figure 3B:
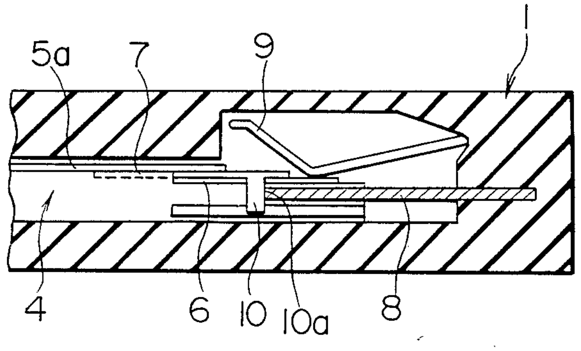
FIG. 3B PRIOR ART
Figure 3C:
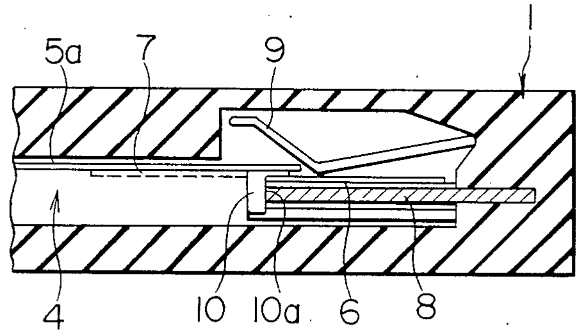
FIG. 3C PRIOR ART
Figure 4A:
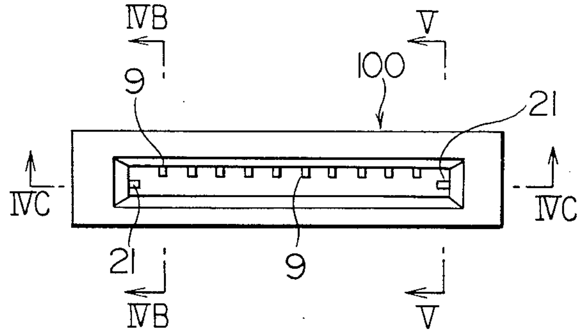
FIG. 4A is a front view of a connector provided in an external device for an IC card in accordance with the present invention.
Figure 4B:
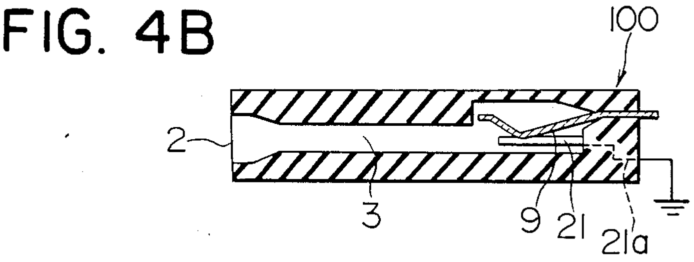
FIG. 4B is a cross-sectional view taken along the line IVB—IVB of FIG. 4A.
Figure 4C:
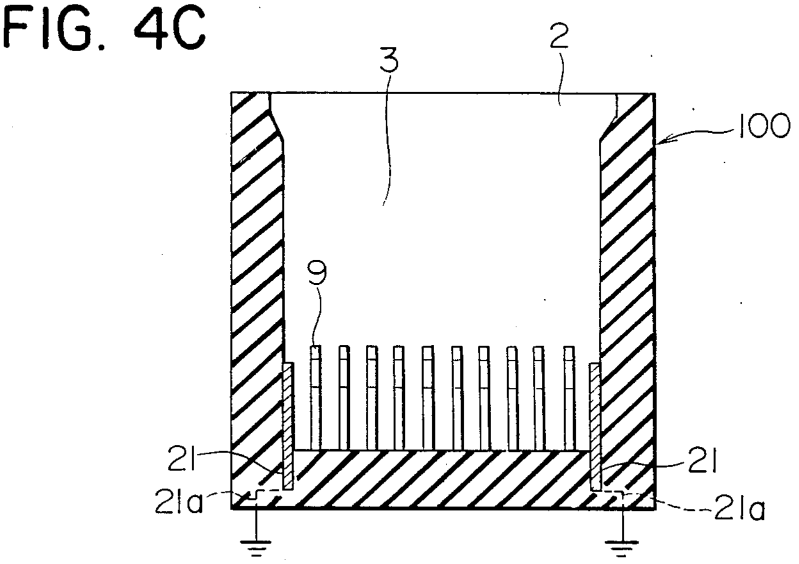
FIG. 4C is a cross-sectional view taken along the line IVC–IVC of FIG. 4A.

FIGS. 4A, 4B, and 4C are a front view, a side sectional view and a top sectional view of a connector provided in an external device for an IC card in accordance with the present invention. In these figures, the components equivalent to those shown in FIGS. 1A to 1C are indicated by the same reference numerals, and details of their descriptions will not be repeated. Shutter-opening-closing pins 21 are mounted in a card reader connector 100 and are grounded via earth lines 21*a*. The whole body of each pin is formed from an electrically conductive material such as brass. These pins 21 are designed to move the shutter 7 in the direction opposite to that of the insertion of the IC card, thereby opening the shutter 7 when the IC card 4 is inserted into the connector.

Since, in the thus-constructed card reader connector 100, the shutter-opening-closing pins 21 are formed from an electroconductive material and these electroconductive members are grounded via the earth lines 21*a*, static electricity which occurs between the card reader connector 100 and the IC card 4 (see FIGS. 4A–4C) and/or between the shutter 7 and the package 5 of the IC card 4 can be inhibited from flowing through the external terminals 6 of the IC card 4 and/or the electrodes of the card reader connector.

Figure 5A:
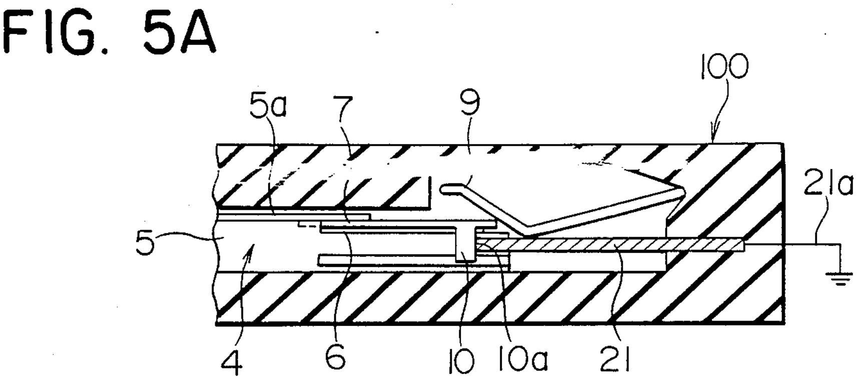
FIGS. 5A, 5B, and 5C are partial cross-sectional views of the connector of the external device for the IC card in accordance with the present invention taken along lines V—V of FIG. 4A, illustrating the insertion of the IC card into the connector.
Figure 5B:
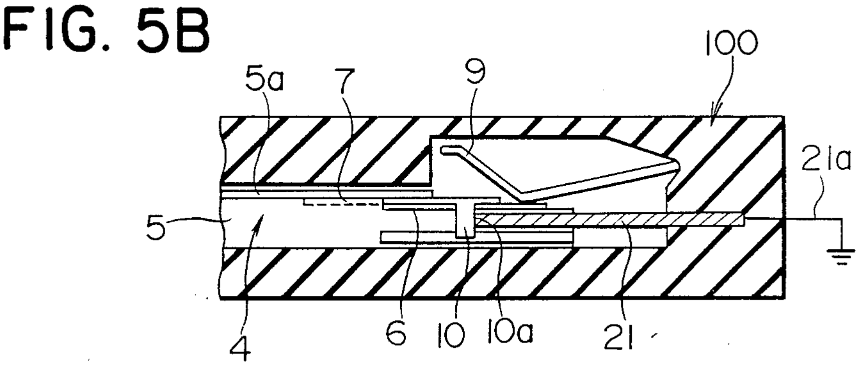
Figure 5C:
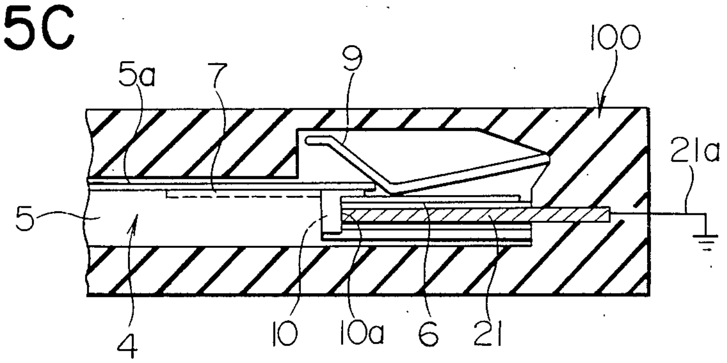

When the IC card 4 is used with the card reader connector 100 in accordance with the present invention, the IC card 4 is inserted through the card-insertion opening 2 into the card-receiving portion 3 of the card reader connector 100, in a manner similar to that of the conventional method. At the same time, as shown in FIGS. 5A, 5B, and 5C, the pin-contact portions 10*a* of the slide members 10 are brought into contact with the pins 21 so as to open the shutter 7 and to connect the external terminals 6 of the IC card 4 and the electrodes 9 of the card reader connector 100 to each other.

The connection of the electrodes 9 of the card reader connector 100 and the external terminals 6 of the IC card 4 is released by pulling the IC card 4 out of the card-receiving portion 3.

In this embodiment, the whole body of each of the pins 21 is formed from an electroconductive material, but the present invention is not limited thereto. Pins having surfaces coated with an electroconductive material are as effective as those in accordance with the above-described embodiment. The kind of electroconductive material in accordance with the present invention is not limited to that used in the above-described embodiment. For example, metallic material such as copper may be used, and the kind of material can be selected as desired.

In accordance with the present invention, as described above, pins for opening the shutter are formed from an electroconductive material and are grounded, thereby preventing static electricity caused by friction between the connector of the external device and the IC card or between the shutter and the package of the IC card from flowing through the external terminals of the IC card or the electrodes of the card reader connector when the IC card is inserted into or pulled out from the connector. It is therefore possible to prevent breakdown of the semiconductor device or occurrence of software errors when the connector is used, thereby enabling an improvement in IC card operation reliability.

What is claimed is:

1. A connector provided in an external device for an IC card having a card shutter provided with at least one slide member, said shutter being capable of advancing and retreating and adapted to cover and protect external terminals of said IC card when said IC card is not used, said connector comprising:

a connector casing body forming a card-receiving portion in which said IC card is inserted;

a plurality of electrodes for contacting the external terminals of the IC card when the IC card is inserted in said card-receiving portion;

at least one electrically conductive pin adapted to move said shutter in the direction opposite to that of the insertion of said IC card so as to open said shutter by contacting said slide member of said card shutter when said IC card is inserted into said connector; and grounding means for grounding said pin.

2. A connector provided in an external device for an IC card according to claim 1, wherein said grounding means is an earth line for grounding said electroconductive pin.

3. A connector provided in an external device for an IC card according to claim 1, wherein only a surface of said pin is electrically conductive and said grounding means is an earth line for grounding said pin.

* * * * *